United States Patent [19]

Kakutani

[11] 4,195,348
[45] Mar. 25, 1980

[54] COMBINED ELECTRONIC DIGITAL SCALE AND CALCULATOR STORING SELECTABLE PROGRAMS

[75] Inventor: Nobuyasu Kakutani, Yau, Japan
[73] Assignee: Sharp Kabushiki Kaisha, Osaka, Japan
[21] Appl. No.: 880,093
[22] Filed: Feb. 22, 1978
[30] Foreign Application Priority Data Feb. 22, 1977 [JP] Japan ................................. 52-19578
Mar. 31, 1977 [JP] Japan ............................ 52-40331[U]

[51] Int. Cl.² ........................ G01B 3/08; G06F 7/48
[52] U.S. Cl. ................................. 364/562; 33/140; 235/92 DN; 364/705; 364/709
[58] Field of Search ......................... 364/560–562, 364/705, 580, 709; 235/92 DN, 92 PE, 92 EV, 92 CP; 33/121–124, 125 N, 125 R, 133, 141 R, 142, 137 R, 137 L, 140; 242/84.8

[56] References Cited

U.S. PATENT DOCUMENTS

| | | | |
|---|---|---|---|
| 3,654,449 | 4/1972 | Boyce | 364/709 |
| 3,760,171 | 9/1973 | Wang et al. | 364/709 |
| 4,031,360 | 6/1977 | Soule, Jr. | 235/92 MP |

Primary Examiner—Errol A. Krass
Attorney, Agent, or Firm—Birch, Stewart, Kolasch & Birch

[57] ABSTRACT

A selectable program unit is stored within a combined electronic digital scale and calculator. The selectable program unit includes three programs to obtain the area of a triangle or a circle, and the volume of a rectangular solid. Selection keys for selecting one of the stored programs are provided on the body of the combined electronic digital scale and calculator. The programs are used in conjunction with effected using measurement results determined by an extensible tape member housed within the combined electronic digital scale and calculator. Adjusting the extensible tape member to an object to be measured obtains the measurement results regarding the object. The selective program unit may include unit conversion programs for converting the unit of centimeter to that of the Japanese foot, the inch, and the foot. The combined electronic digital scale and calculator has also conventional calculation functions responsive to actuated number and function keys formed on the body thereof.

7 Claims, 5 Drawing Figures

COMBINED ELECTRONIC DIGITAL SCALE AND CALCULATOR STORING SELECTABLE PROGRAMS

BACKGROUND OF THE INVENTION

The present invention relates to a combined electronic digital scale and calculator and, more particularly, a combined electronic digital scale and calculator which is adapted to select one of several selectable stored programs in response to measurement results determined by an extensible tape member implemented therewithin.

A prior art measurement instrument was disclosed, for example, in Taylor U.S. Pat. No. 3,780,440 "MEASUREMENT INSTRUMENT" issued on Dec. 25, 1973. The measurement instrument stores no selectable programs which manipulate measurement results obtained by the extensible tape member. Furthermore, selection means for selecting one of the stored programs was not provided for directing the instrument to manipulate stored information introduced through the use of the extensible tape member in accordance with the selected program.

Therefore, a combined electronic digital scale and calculator is most desirable, which stores a plurality of selectable programs for manipulating the stored information obtained using the extensible tape member. The selectable programs can further enhance further the application of. functions of the combined electronic digital scale and calculator.

OBJECTS AND SUMMARY OF THE INVENTION

Accordingly, it is an object of the present invention to provide a novel combined electronic digital scale and calculator which simplifies measurement procedures to determine desirable data associated with the object to be measured through the use of an extensible tape member.

It is another object of the present invention to provide a novel combined electronic digital scale and calculator which stores a plurality of selectable programs responsive to the actuation of selection means.

It is still another object of the present invention to provide a novel combined electronic digital scale and calculator which manipulates measurement results obtained using an extensible tape member is accordance with one of a plurality of stored programs selected by selection means.

Other objects and futher scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a plurality of selectable programs are stored in a program storing unit of a combined electronic digital scale and calculator, the selected programs being effected when determining the area of a triangle or a circle, and a volume of a rectangular solid each of which is an object to be measured through an extensible tape member included within the combined electronic digital scale and calculator. Selection means are provided for selecting one of the programs out of the stored programs, the selection means being formed on the body of the combined electronic digital scale and calculator.

In another embodiment of the present invention, the selectable programs are unit conversion programs for converting the unit of centimeter to that of the Japanese foot, the inch, and the foot, the unit of centimeter being available in the usual operation of the combined electronic digital scale and calculator.

The combined electronic digital scale and calculator also functions as the well-known electronic calculator which calculates the introduced numeral information in response to the actuation of any digit key or keys on a keyboard and in response to the activation of a command key for directing the electronic calculator how to manipulate the information. The detail of the electronic calculator is disclosed in U.S. Pat. No. 3,829,957 entitled "DIGIT MASK LOGIC COMBINED WITH SEQUENTIALLY ADDRESSED-MEMORY IN ELECTRONIC CALCULATOR CHIP", issued on July 1, 1975 and assigned to Texas Instruments Inc., etc.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
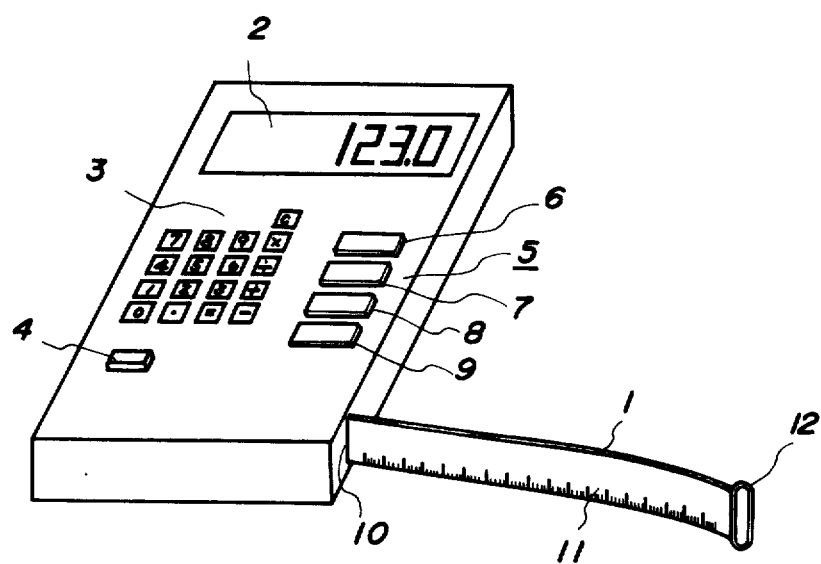
FIG. 1 is a perspective view of a combined electronic digital scale and calculator according to the invention.

FIG. 1 shows a combined electronic digital scale and calculator 5 of the present invention which includes an extensible tape member 1, a display 2, a key board 3, a mode selection key 4, and selection keys 6, 7, 8 and 9. The extensible tape member 1 can be pulled out of the housing through an opening 10 of the combined electronic digital scale and calculator 5 to measure the length of an object with attachment to the object.

The length of the object is determined by the amount of the extended length of the extensible tape member 1 when pulled housing of the combined electronic digital scale and calculator 5. The extensible tape member 1 is pulled back into the housing thereof by a spring located in a reel (not shown) which accommodates and stores the extensible tape member 1. An operator can directly measure the length of the object only through the use of graduations 11 formed on the surface of the extensible tape member 1. A ring 12 is attached to an end portion of the extensible tape member 1 for ensuring the extending operation of the extensible tape member 1.

The key board 3 comprises a plurality of numeral keys and functions keys which direct an electronic calculator how to manipulate the numeral information derived from the actuation of the numeral keys when entered into the electronic calculator and utilizing the electronic calculator mode of operation of the combined electronic digital scale and calculator 5. The mode selection key 4 selects one mode of the combined electronic digital scale and calculator 5 among the two modes which include an electronic digital scale mode and the electronic calculator mode of the combined electronic digital scale and calculator 5. The mode for selecting the electronic calculator is selected by an even actuation of the mode selection key 4. The electronic digital scale mode is enabled by an odd actuation of the mode selection key 4.

The selection keys 6 through 9 are provided for selecting one out of a plurality of stored programs through the actuation thereof.

Figure 2:
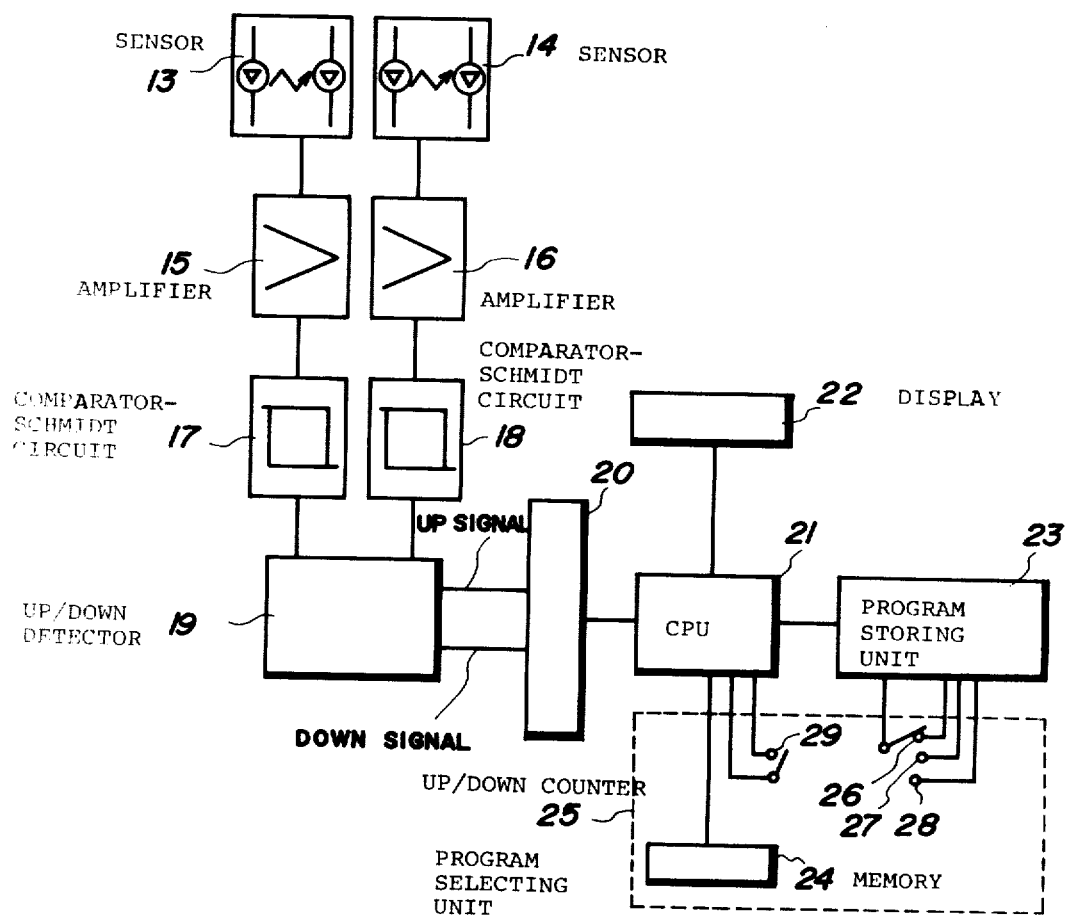
FIGS. 2 and 3 are schematic electronic circuit diagrams of an electronic circuit according to the invention, respectively.

FIG. 2 shows an electronic circuit employed within the combined electronic digital scale and calculator 5, wherein the distance information as to the extending length of the extensible tape member 1 is subsequently stored therein as described hereinbelow in the electronic digital scale mode of the combined electronic digital scale and calculator 5.

The electronic circuit comprises a pair of sensors 13, 14, a pair of amplifiers 15, 16, a pair of comparator-schmidt circuits 17, 18, an up/down detector 19, and up/down counter 20, a CPU (central prosessor unit) 21, a display 22, a program storing unit 23, and a program selecting unit 25. The sensors 13, 14 detect the travel of the extensible tape member 1 in determining the measured length, each of which includes a couple of a light emitting element and a light receiving element and provides signals corresponding to the travelled distance of the extensible tape member 1, The amplifiers 15, 16 amplify the signals up to a predetermined level enough for subsequent treatment within the electric circuit.

The comparator-schmidt circuits 17, 18 function to shape the signals derived from the amplifiers 15, 16. The up/down detector 19 judges the signals to be count up signals or count down signals to thereby provide up signals or down signals. The up/down counter 20 develops control signals in response to the up signals or the down signals.

The control signals are introduced into the CPU 21 to indicate numeral information in the display 22 corresponding to the traveled distance of the extensible tape member 1. The CPU 21 also compensates for the rotation amount of the rotatory reel which accommodates the extensible tape member 1 because the rotation velocity amount of the rotatory reel varies in accordance with the remaining amount of the extensible tape member 1. The proper extending length S of the extensible tape member is defined by the following equation.

$$S = Kn \cdot Ln^2 \qquad (1)$$

wherein n: the count of the up/down counter 20

Figure 3:
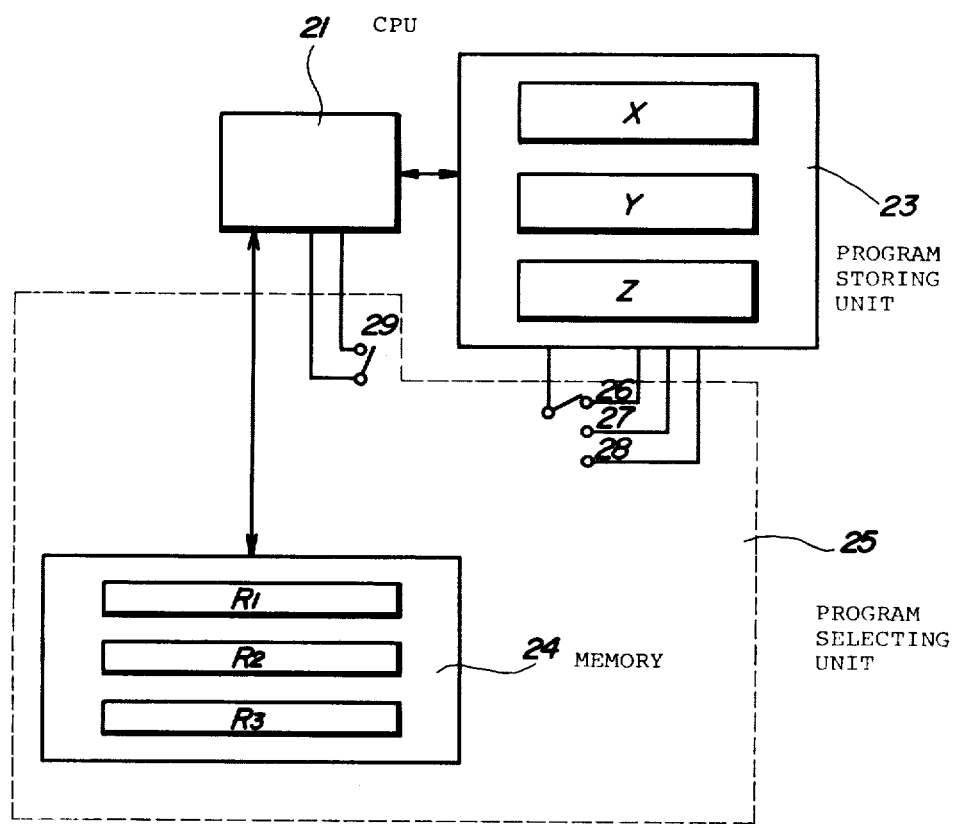

K,L: the constants defined by the radius of the shaft of the rotatory reel, the thickness and the total length of the extensible tape member 1, and the interval of the adjacent two slits formed in the rotatory reel As illustrated in FIG. 3, the program storing unit 23 comprising an ROM (read only memory) has three selectable stored programs X,Y, and Z, X being effected to determine the area of a measured triangle, Y being utilized for obtaining the area of a measured circle, and Z being directing to derive the volume of a measured rectangular solid. These three stored programs are operated in accordance with distance information obtained through the use of the extensible tape member 1.

The program selecting unit 25 comprises a memory 24, and a plurality of selection switches 26, 27, 28 and 29. Three selection switches 26, 27 and 28 are provided for selecting a desired program among the three stored programs X, Y, and Z, respectively. The memory 24 is connected to the CPU 21 so that the distance information introduced into the CPU 21 is subsequently introduced into the memory 24 in accordance with the actuation of the selection switch 29 as program data for the three stored programs X, Y, and Z.

The selection switches 26, 27, 28 and 29 are related to the selection keys 6, 7, 8 and 9 formed on the housing of the combined electronic digital scale and calculator 5. The memory 24 comprises three registers R1, R2 and R3 as shown in FIG. 3.

Figure 4:
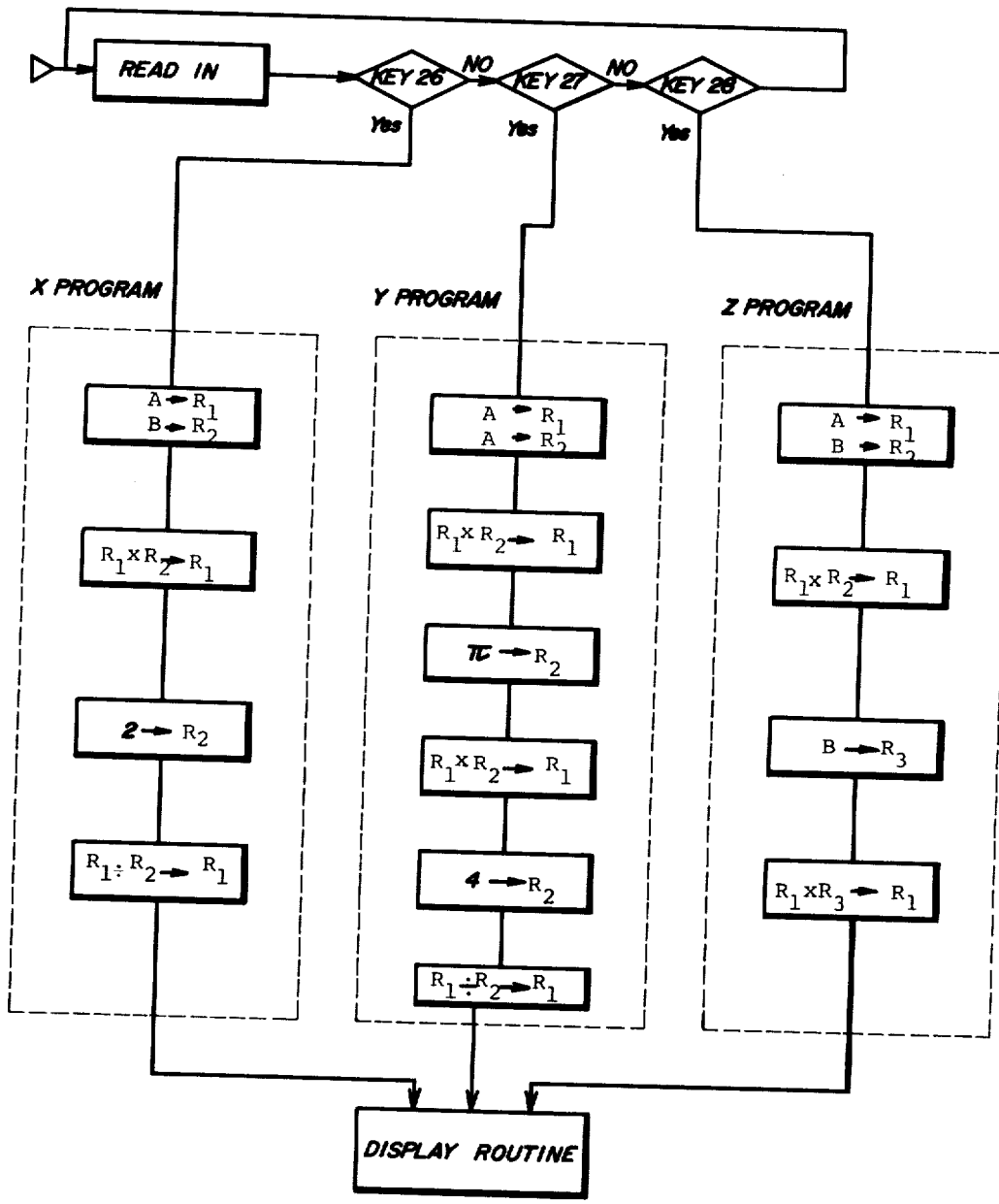
FIG. 4 is a flow chart showing the function of the electronic circuit diagram illustrated in FIG. 3.

FIG. 4 shows a flow chart utilized within the three stored programs X, Y, and Z. The distance information is read in to be manipulated in one of the three stored programs X, Y, and Z in accordance with the actuation of one of the three selection switches 26, 27 and 28. KEYS 26, 27, and 28 are related to the selection switches 26, 27 and 28. Measured results are introduced into a display routine after processing in the stored program through the use of the distance information to thereby indicate the measured results in the display 22.

The procedures for obtaining the measured results using the stored program X are described hereinbelow, the stored program X being effected to determine the area of the triangle.

Initially, the mode selection key 4 is activated to place the combination electronic digital scale and calculator 5 in the electronic digital scale mode.

The selection switch 26 is pressed down to select the stored program X. Unde these circumstances, the extensible tape member 1 is pulled out of the housing of the combined electronic digital scale and calculator 5 to attach the extensible tape member 1 to the base of the measured triangle. Derived distance information A corresponding to the length of the base is introduced into the CPU 21 as described above to display the distance information of the base in the display 22. Thereafter, the selection key 9 is actuated to enter the distance information A into the memory register R1 of the memory 24. The perpendicular bisector of the base line is also determined through the attachment of the extensible tape member 1.

Thus derived distance information B corresponding to the length of the perpendicular bisector of the base line is also introduced into the CPU 21. The actuation of the selection key 9 introduces the distance information B into the memory register R2 of the memory 24. This satisfies the necesary data for causing calculation operations in accordance with the stored program X.

The stored program X is effected in accordance with calculation steps as illustrated in the flow chart of FIG. 4. That is, the memory register R1 receives the distance information which is derived in such a manner that the distance information A is multipled by the distance information B. A numeral 2 is introduced into the memory register R2. Thereafter, the distance information $A \times B$ stored in the memory register R1 is divided by two stored in the memory register R2 and is entered into the memory register R1. The display routine is effected to display the distance information stored in the memory register R1.

Similar procedures are effected with the stored programs Y and Z to obtain the area of the circle and the volume of the rectangular solid through the use of the actuation of the selection switches 27 and 28.

The stored programs X, Y, and Z are may be initially utilized effected by actuation of the selection switches 26, 27 and 28 after the entry of the measured results obtained through the use of the extensible tape member 1. Meanwhile, the memory 24 can sequentially store the distance information in response to the close of the selection switch 29. The distance information is serially read out from the memory 24 to operate one of the selected stored programs X,Y,Z in accordance with the selection of one of switches 26, 27 and 28. The distance information stored in the memory 24 is erased after the termination of operations in one of the stored programs X, Y, and Z, erasure being effected automatically or manually by means of a memory clear key (not shown) provided within the key board 3.

The memory 24 and the selection switch 29 can not be required to cause the stored program Y to operate because only one type of distance information satisfies the stored program Y. The stored program Y can be selected by means of the actuation of the selection key 7 afte the completion of the measurement of the distance information.

Figure 5:
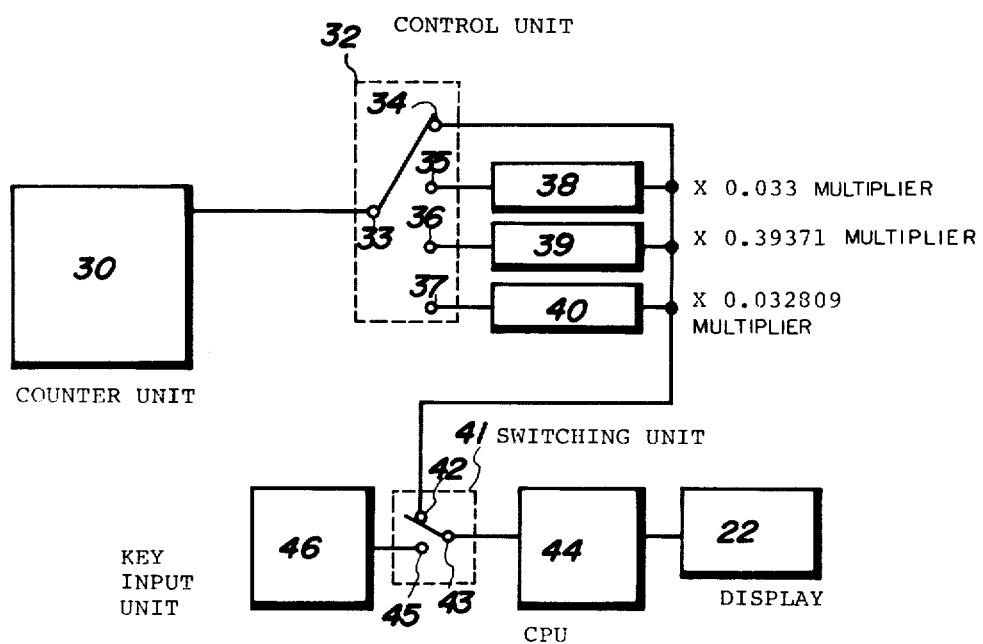
FIG. 5 is a schematic electronic circuit diagram of another electronic circuit according to the invention.

FIG. 5 shows another electronic circuit of the combined electronic digital scale and calculator 5.

The electronic circuit shown in FIG. 5 comprises a counter unit 30, a control unit 32, an × 0.033 multiplier 38, an × 0.39371 multiplier 39, an × 0.032809 multiplier 40, a switching unit 41, a key input unit 46, the CPU 44, and the display 22. The counter unit 30 is related to the sensors 13, 14, the amplifiers 15, 16, the comperator-schmidt circuits 17, 18, the up/down detector 19, and the up/down counter 20 shown in FIG. 2. The distance information derived from the counter unit 30 utilizes centimeter units in a prefereed form. Five terminals 33, 34 35 36 and 37 included within the control unit 32 are related to the selection keys 6, 7, 8 and 9 which control the order of derived distance information. When units of the Japanese foot is desired for the distance information, the terminal 33 of the output side of the counter unit 30 is connected to the terminal 35 which is the input side of the × 0.033 multiplier 38. Similarly, the terminal 36 of the input side of the × 0.39371 multiplier 39 is utilized for obtaining the distance information with units of the inch. Ther terminal 37 of the input side of the × 0.032809 multiplier 40 is activated to determine the distance information with units of the foot. The terminal 34 is connected to the terminal 33 when the distance information is desired with units of the centimeter. That is, the selection keys 6, 7, 8 and 9 control the connection of the terminal 33 and one of the terminals 34, 35 36 37, respectively.

The × 0.033 multiplier 38 functions to multiply the input by 0.033 in order to obtain the distance information with in units of the Japanese foot. Similarly, the × 0.39371 multiplier 39 multiplies the input by 0.39371 to determine the distance information in units of the inch. The × 0.32809 multiplier 40 multiplies the input by 0.032809 to measure the distance information in units of the foot.

The switching unit 41 is related to the mode selection key 4 shown in FIG. 1. The electronic digital scale mode of the combined electronic digital scale and calculator 5 is used by the switching to a terminal 42 with a terminal 23 both included within the switching unit 41.

Under these circumstances, the distance information is introduced into the CPU 44 directly or through one of the multipliers 38, 39 and 40. The electronic calculator mode of the combined electronic digital scale and calculator 5 is selected through the connection of a terminal 45 and the terminal 43. The terminal 45 is placed at the output side of the key input unit 46 which is enabled for functioning as the conventional electronic calculator to manipulate stored information in accordance with the actuation of keys on the key board 3. The distance information can be manipulated by means of the key input unit 46, the distance information being stored in the CPU 44.

Different kinds of programs can be stored in with addition to the stored programs X, Y, and Z, such programs being, for example, the volume of a right circular cylinder, or a circular cone, etc.

Desirable multiplier means can be provided for converting the units of the distance information to other desired units. That is, the measured distance information can be converted to the desired units thereof and may be derived after the manipulation of the introduced date by the stored programs X, Y, and Z as described above.

It will be apparently noted that the present invention is equally applicable to an electronic digital scale only, although the above description has been made about the combined electronic digital scale and calculator.

While only certain embodiments of the present invention have been described, it will be apparent to those skilled in the art that various changes and modifications may be made therein without departing from the spirit and scope of the invention as claimed.

What is claimed is:

1. A small portable electronic data processing apparatus, comprising:
 a housing;
 a rotary support means mounted within said housing and adapted to be rotated within said housing;
 an extensible member coiled onto said support means and adapted to be pulled out from said housing;
 detection means for measuring the degree of rotation of said support means thereby generating an output detection signal indicative of the extending length of said extensible member when pulled out from said housing;
 counter means responsive to said output detection signal for providing a count indicative of the length of said extensible member when pulled out from said housing in accordance with said output detection signal generated by said detection means;
 program storage means for storing a plurality of programs, said programs being capable of processing said count from said counter means which is representative of the length of said extensible member when pulled out from said housing to yield a predetermined type of resultant output data;
 storage means for storing said count provided by said counter means thereby resulting in the storage of preliminary measurement data;
 first selection means on said housing for selecting one of said plurality of programs stored in said program storage means;
 processing means responsive to an output signal from said storage means and from said program storage means for processing said preliminary measurement data stored in said storage means in accordance with said one of said plurality of programs selected by said first selection means thereby yielding said predetermined type of resultant output data; and display means for displaying said resultant output data.

2. A small portable electronic data processing apparatus in accordance with claim 1 wherein said count provided by said counter means is expressed in a first unit of measurement;

said electronic data processing apparatus further comprises a unit conversion means responsive to an output signal from said counter means for converting said count expressed in said first unit of measurement into a count expressed in a second unit of measurement, said count expressed in said second unit of measurement being stored in said storage means and processed by said processing means in accordance with said one of said plurality of programs selected by said first selection means.

3. A small portable electronic data processing apparatus in accordance with claim 2 further comprising unit conversion selection means responsive to said output signal from said counter means for selecting one of a plurality of different units of measurement for processing and display purposes; and wherein said unit conversion means converts the count expressed in said first unit of measurement and provided by said counter means into a count expressed in the unit of measurement indicated by said unit conversion selection means thereby providing a modified count indicative of the length of said extensible member when pulled out from said housing and expressed in said unit of measurement indicated by said unit conversion selection means;

said storage means stores said modified count thereby resulting in the storage of modified preliminary measurement data;

said processing means processes said modified preliminary measurement data in accordance with said one of said plurality of programs selected by said selection means thereby yielding a modified predetermined type of resultant output data; and said display means displays said modified type of resultant output data in said units of measurement indicated by said unit conversion selection means.

4. A small portable electronic data processing apparatus in accordance with claims 2 or 3 further comprising:

second selection means on said housing for selecting a first mode of operation or a second mode of operation of said electronic data processing apparatus, said electronic data processing apparatus capable of operating as an electronic digital scale when said second selection means has been actuated to indicate said first mode of operation, said data processing apparatus capable of operating as a calculator when said second selection means has been actuated to indicate said second mode of operation, said second selection means connecting a key input unit on said housing to said processing means when said second mode of operation is selected, said second selection means connecting said unit conversion means to said processing means when said first mode of operation is selected.

5. A small portable electronic data processing apparatus in accordance with claim 1 further comprising:

a second selection means on said housing for selecting a first mode of operation or a second mode of operation in the operation of said electronic data processing apparatus, said electronic data processing apparatus capable of operating as an electronic digital scale when said second selection means has been actuated to indicate said first mode of operation, said data processing apparatus capable of operating as a calculator when said selection means has been actuated to indicate said second mode of operation, said second selection means connecting a key input unit to said processing means when said second mode of operation is selected, said second selection means connecting said counter means to said processing means when said first mode of operation is selected.

6. A small portable electronic data processing apparatus in accordance with claim 3 wherein said first unit of measurement includes a centimeter unit of measurement;

wherein said unit conversion means comprises:

a first multiplier means responsive to an output signal from said counter means for converting said count of said counter means expressed in said centimeter unit of measurement to a count expressed in a unit of measurement representative of the Japanese foot;

a second multiplier means responsive to an output signal from said counter means for converting said count of said counter means expressed in said centimeter unit of measurement to a unit of measurement representative of the inch; and a third multiplier means responsive to an output signal from said counter means for converting said count of said counter means expresed in said centimeter unit of measurement to a unit of measurement representative of the foot.

7. A small portable electronic data processing apparatus in accordance with claim 6 wherein said unit conversion selection means comprises:

a bypass terminal position;

a first active terminal position;

a second active terminal position; and a third active terminal position;

wherein said bypass terminal position bypasses said unit conversion means thererby providing a count from said counter means expressed in said centimeter unit measurement;

said first active terminal position connects said countermeans to said first multiplier means when said unit conversion selection means is actuated in said first active terminal position;

said second active terminal position connects said counter means to said second multiplier means when said unit conversion selection mean is actuated in said second active terminal position; and said third ac.ive terminal position connects said counter means to said third multiplier means when said unit conversion selection means is actuated in said third active terminal position.

* * * * *